United States Patent [19]

Coffin, Sr.

[11] Patent Number: 4,663,203

[45] Date of Patent: May 5, 1987

[54] ADJUSTABLE CANDLEHOLDER

[76] Inventor: Merrill J. Coffin, Sr., P.O. Box 2344, Santa Barbara, Calif. 93120

[21] Appl. No.: 776,038

[22] PCT Filed: Jan. 3, 1984

[86] PCT No.: PCT/US84/00006

§ 371 Date: Aug. 8, 1985

§ 102(e) Date: Aug. 8, 1985

[51] Int. Cl.[4] .......................... A45B 19/00; F23D 3/16; B23Q 3/00; B23B 5/22

[52] U.S. Cl. .......................................... 428/12; 269/287; 431/289; 431/292; 431/295; 431/297; 279/66; 279/117

[58] Field of Search ................ 269/287; 431/289, 292, 431/295, 297; 279/66, 117; 428/12

[56] References Cited

U.S. PATENT DOCUMENTS

| | | | |
|---|---|---|---|
| 559,875 | 5/1896 | Thelen | 431/289 |
| 1,331,709 | 2/1920 | Harmata | 431/289 |
| 2,163,137 | 6/1939 | Ager-Wick | 248/523 |
| 2,246,953 | 6/1941 | Romano | 431/289 |

FOREIGN PATENT DOCUMENTS

| | | | |
|---|---|---|---|
| 30305 | 7/1884 | Fed. Rep. of Germany | 431/289 |
| 54405 | 3/1890 | Fed. Rep. of Germany | 431/297 |
| 147900 | 11/1902 | Fed. Rep. of Germany | 431/289 |
| 268495 | 11/1912 | Fed. Rep. of Germany | 431/297 |
| 2674 | of 1876 | United Kingdom . | |

*Primary Examiner*—John E. Kittle
*Assistant Examiner*—Patrick J. Ryan
*Attorney, Agent, or Firm*—Albert O. Cota

[57] ABSTRACT

An improved adjustable candleholder (10) that allows candles of various diameters to be secured within the candleholder. The candleholder (10) is comprised of a base assembly (12) having an upper section (12a) and a lower section (12g), and a candleholder mechanism (14) that is secured within the upper section (12a). The mechanism comprises a pinion gear (17c) that operates three rack gears (16b) that include a vertical clamping segment (16d). The segments expand and retract to increase or decrease the clamping diameter. To operate, the lower section (12g) is held stationary while the upper section (12a) is rotated to increase the clamping diameter of the mechanism. A candle is then inserted and the upper section is counter-rotated until the clamping segments (16d) grip and secures the candle. An adjustable candleholder mechanism insert (50) is also disclosed that operates independently from the candleholder base. In this design a third jaw assembly (54) closes and opens by rotating the candle inserted into the mechanism insert (50).

2 Claims, 21 Drawing Figures

Fig.1.
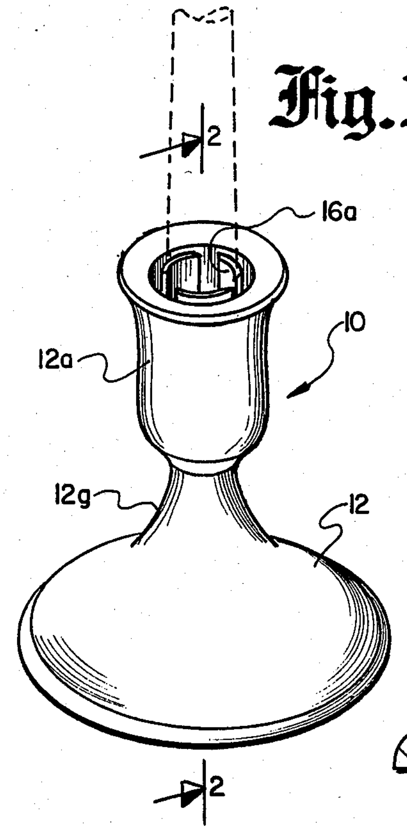
Fig.2.
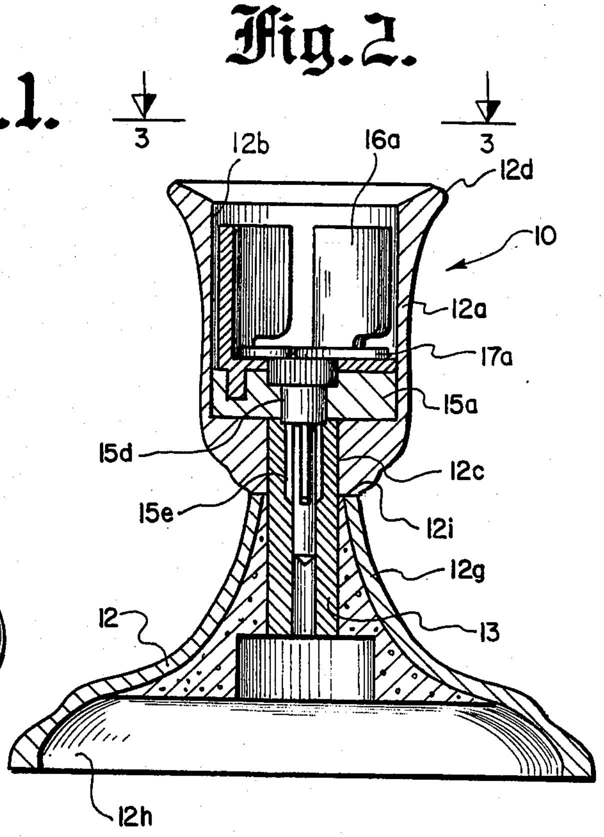
Fig.3.
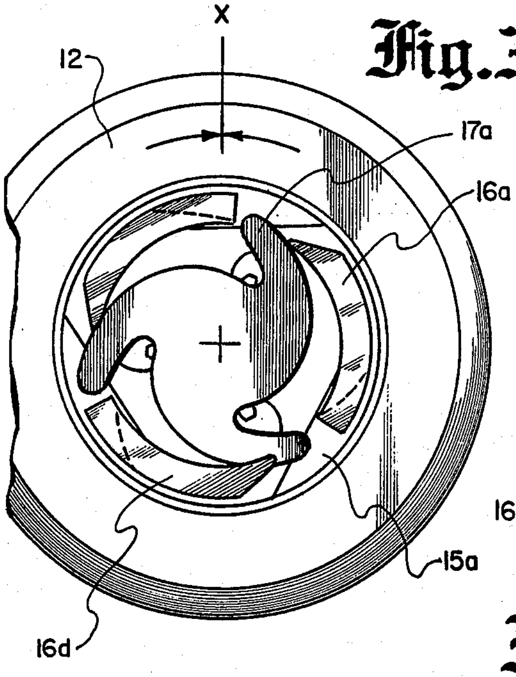
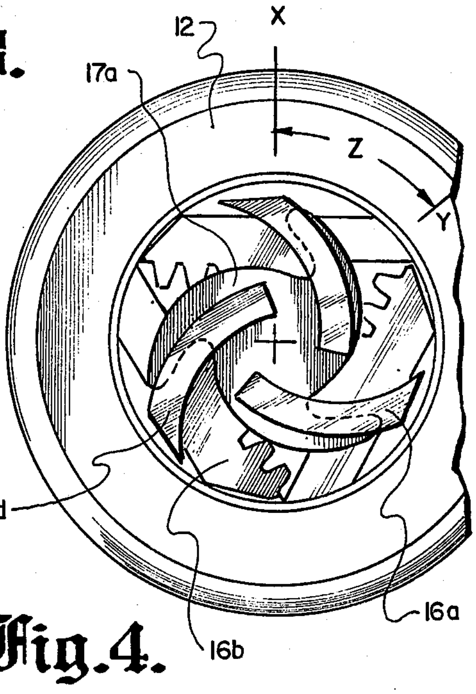
Fig.4.

ADJUSTABLE CANDLEHOLDER

TECHNICAL FIELD

This invention pertains to the general field of adjustable candleholders and more particularly to adjustable candleholders incorporating a self-centering mechanism that allows candles of various diameters to be securely gripped in a perpendicular position.

BACKGROUND ART

Candleholders in contemporary use serve primarily as decorative pieces and secondarily for functional lighting. Most conventional candleholders have an upper circular cavity that is sized to firmly hold candles of one diameter only. Therefore, to use these candleholders with candles having a diameter that is larger or smaller than the diameter of the opening, it is necessary to modify the candle. In cases of larger candles the candle bottom must be shaved to the required diameter; when the candle is of a smaller diameter it becomes necessary to wrap the bottom with a tape, or the like, until the candle is of sufficient diameter to securely fit into the circular opening.

There have also been designs disclosed where the candleholder is fitted with a self-centering mechanism that grips candles of various diameter in a perpendicular position. Most of these mechanism employ a plurality of segments or jaws that move in a uniform motion towards or away from the central axis of the candleholder when a cap, located on top of the candleholder, is rotated. Other mechanisms use a set of springs where one end of the spring is secured to the inside wall of the candleholder and the other to a set of plates or jaws that are opened or drawn towards the center by the action of the springs when a handle is depressed.

The problem of having one candleholder suffice for a number of candle diameters is solved by some of the prior art devices. However, these universal candleholders use a multiplicity of parts that have a tendency to bind by virtue of the mechanism design and/or by wax droppings that clog the mechanism. Additionally, because of the quantity and intricacy of some of the parts a malfunction may be difficult to locate and repair.

A search of the prior art did not disclose any patents or publications that directly read on the candleholder mechanism used in the instant invention. However, the following U.S. patents were considered in the investigation and evaluation of the prior art:

| U.S. Pat. No. | INVENTOR | ISSUED |
|---|---|---|
| 2,246,953 | Romano | 24 June 1941 |
| 2,163,137 | Ager-Wick | 20 June 1939 |
| 1,331,709 | Harmata | 24 February 1920 |

The Romano patent discloses a candleholder in which candles of various diameters may be supported and held in a vertical position in the candleholder. A mechanism is employed that includes a set of springed arms, levers, jaws and operating handles. The springed arms exert pressure on the levers which tend to close the jaws. When a candle is placed in the candleholder, the handles are pressed together to open the jaws. The candle is than inserted between the jaws and the handles are released to permit the jaws to close upon and hold the candle in place.

The Ager-Wick patent also disclose a candleholder equipped with a self-centering mechanism that grips candles of various sizes in a perpendicular position. The mechanism is comprised of three segments or jaws having perpendicular projections for gripping the candle. By turning a cap, located on top of the candleholder, all three segments are caused to move in a uniform motion towards or away from the central axis of the candleholder.

The Harmata patent describes a candleholder employing a mechanism that supports candles of various diameters in a perpendicular position. The mechanism is comprised of a plurality of conically wound springs arranged in upper and lower rows and secured to the inside walls of the candleholder. The springs are attached to a plurality of plates having arcuate faces that are drawn inwardly towards the center by the action of the springs. Thus holding a candle inserted between the plates.

DISCLOSURE OF THE INVENTION

The improved adjustable candleholder allows candles of various diameters and shapes to be centrally located and perpendicularly secured within the candleholder. The problems inherent with conventional candleholders and those employing mechanisms allowing the usage of several size candles, as described in the BACKGROUND ART section, are solved by the instant invention.

The preferred embodiment of the improved adjustable candleholder is comprised of a base having an upper section and a bottom section. The upper section incorporates a mechanism employing a set of rack and pinion assemblies having three clamping segments that expand and retract in a circular motion to respectfully increase or decrease the clamping diameter. The candle diameter desired is adjusted by holding the bottom section stationery and rotating the upper section. To increase the clamping diameter, the upper section is rotated in a counter-clockwise direction; conversely, to decrease the diameter a clockwise rotation is necessary. Thusly, the mechanism provides a self-centering means adjustable to accommodate and secure several sizes of candles with a tight grip and in a perfectly vertical position. There is also disclosed an adjustable candleholder mechanism insert that operates independently from the candleholder base. In this design the mechanism is rigidly inserted into a candleholder and the jaws of the mechanism are made to expand or retract, as required, by rotating the candle inserted into the mechanism.

In addition to providing a candleholder that accepts several size candles, it is also an objective of the invention to provide a mechanism that:

o uses few parts with no springs or levers
o is simple in construction,
o is durable,
o is reliable and relatively maintenance free, and
o can be manufactured at low cost.

BRIEF DESCRIPTION OF THE DRAWINGS

The details of the invention are described in connection with the accompanying drawings in which:

FIG. 1 is a perspective view of the invention showing a partial view of the mechanism.

FIG. 2 is a sectional view of the preferred embodiment taken along lines 2—2 of FIG. 1.

FIG. 3 is a top view of the preferred embodiment taken along lines 3—3 of FIG. 2 showing the clamping segments of the mechanism in the extended position.

FIG. 4 is a top view of the preferred embodiment taken along lines 3—3 of FIG. 2 showing the clamping segments of the mechanism in the retracted position.

BEST MODE FOR CARRYING OUT THE INVENTION

Figure 5:
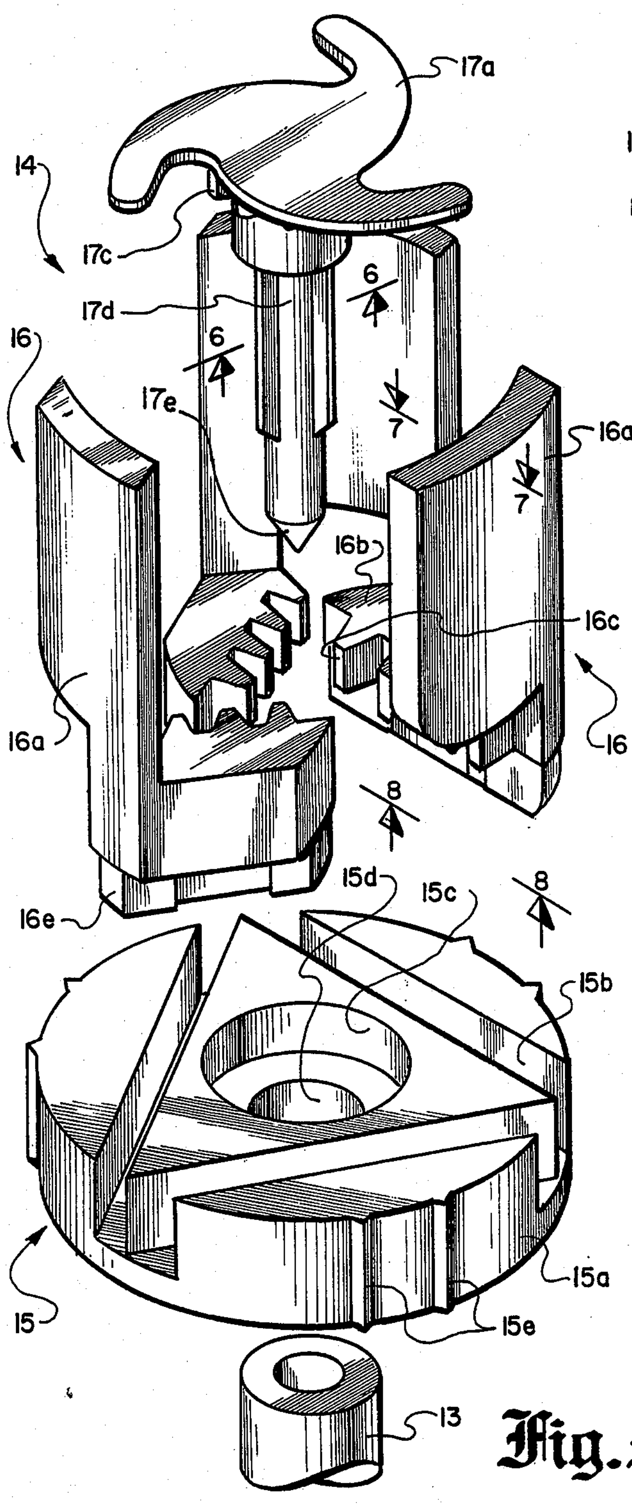
FIG. 5 is an exploded view of the mechanism used in the preferred embodiment.

The invention is described in terms of five embodiments. The commonality inherent in the first four embodiments described is a two-section base assembly where the upper section is rotatably attached to the lower section; the basic difference in the four embodiments is in the configuration of a candle holding mechanism installed in the upper section. In each of these embodiments when the lower section is held stationary and the upper section is rotated three clamping segments or fingers in the mechanism retract or expand to allow candles of various sizes and shapes to be perpendicularly held within the candleholder. The fifth embodiment employs an adjustable candleholder mechanism insert that is not functionally dependent upon the rotation of the two-section base assembly.

The best mode for carrying out the invention or preferred embodiment of the candle holding mechanism used with a two-section base assembly, as shown in FIGS. 1 through 8, is comprised of three major elements: a first base assembly 12; a sleeve 13, and a first candleholder mechanism 14.

The first base assembly 12, as best shown in FIG. 2, is comprised of an upper section **12*a* and a lower section 12*g*. The upper section 12*a* has a first candle/mechanism cavity 12*b* commencing at its top end that is dimensioned to enclose and retain the mechanism 14, described infra, which in turn accepts various sizes and shapes of candles. The bottom end of the upper section 12*a*, that is the bottom of the cavity 12*b*, has a centrally located first sleeve bore 12*c* that has a diameter to accept the upper portion of the sleeve 13. The upper circumference of the upper section in the preferred embodiment also has an outwardly extending lip 12*d*** to retain any hot wax that may drip from the candle during use.

The lower section **12*g* has a first bottom cavity 12*h* that extends upwardly from its bottom end. The end of the cavity has a second sleeve bore 12*i* extending therethrough that is in alignment with the first sleeve bore 12*c*. The sleeve 13, which is inserted and positioned between the first and second sleeve bores 12*c*, 12*i* allows the upper section and lower section to be rotatably attached. The sleeve is held in place in the lower section by filling the first bottom cavity 12*h***, housing the exposed sleeve, with a liquid potting compound that solidifies when dry.

The core of the invention is the first candle mechanism 14 that is inserted into and locked within the first candle mechanism cavity **12*b*. The mechanism is comprised of a first glide structure 15, a first jaw assembly 16 and a cam assembly 17. The structure 15, assembly 16 and assembly 17 synergistically operate to allow candles of various diameters and shapes to be centrally located and perpendicularly secured within the cavity 12*b* of the candleholder 10**.

The first glide structure 15, as best shown in FIG. 5, is further comprised of a first circular disk **15*a* that has on its top surface three first glide channels 15*b* that form an equilateral triangle. On the upper surface of the disk 15*a* and at the centroid of the triangle there is also a pinion gear cavity 15*c* where the bottom-center of the cavity has a cam shaft bore 15*d* extending therethrough. The disk 15*a* is locked to the inner side walls of the upper section 12*a*. In the preferred embodiment the locking is accomplished by a set of vertically oriented locking splines 15*e* that are evenly distributed around the circumference of the disk 15*a*. When the disk is pressed into the upper section the splines 15*e*** are embedded into the inner side walls to hold the disk firmly in place.

Figure 7:
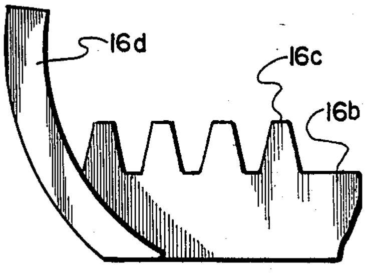
FIG. 7 is a top view of the preferred embodiment jaw assembly taken along lines 7—7 of FIG. 5.
Figure 8:
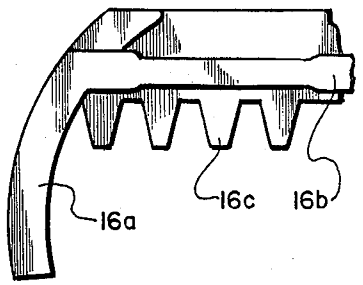
FIG. 8 is a bottom view of the preferred embodiment jaw assembly taken along lines 8—8 of FIG. 5.

The first jaw assembly 16, as also best shown in FIG. 5, comprises three identical first jaw structures **16*a*. Each structure, as shown in FIGS. 7 and 8, is comprised of a first rack gear 16*b*, a first clamping segment 16*d*, and a slide 16*e*. The first rack gear 16*b* has a plurality of gear teeth 16*c* that extend inwardly towards the center of the first glide structure 15. On the outward upper side surface of the rack gear there is located a first clamping segment 16*d*. The segment is curved inwardly and extends upwardly and normal to the side of the rack gear. On the longitudinal bottom side of the first rack gear 16*b* there is a contiguous slide 16*e* extending in a downwardly direction. The slide is dimensioned to slideable traverse the corresponding first slide channel 15***b* on the first glide structure 15. When all three of the jaw structures 16*a* are positioned in their corresponding first slide channels 15*b* the clamping segments form a segmented circular pattern that can securely grip a candle.

Figure 6:
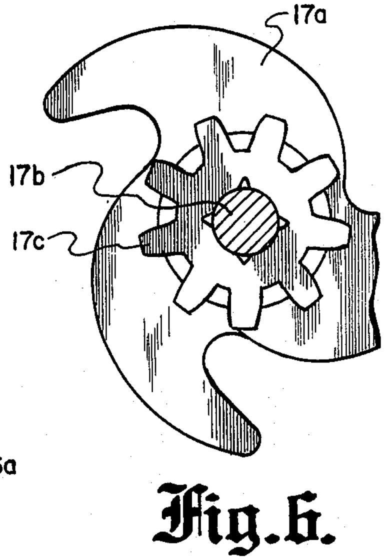
FIG. 6 is a bottom view of the preferred embodiment cam assembly taken along lines 6—6 of FIG. 5.

The clamping segments 16*d* expand and retract by the action of the rotating upper section and are guided in their travel by the cam assembly 17. The cam assembly is comprised of an elliptical cam plate 17*a*, a cam shaft 17*b* and a pinion gear 17*c*. The cam plate, as best shown in FIG. 6, has three evenly spaced curved openings where each opening is shaped to conform to the inward curve of the first clamping segment 16*d*. In the preferred embodiment the cam shaft 17*b* and pinion gear 17*c* are constructed as a single contiguous structure. However, the pinion gear may be a separate entity and conventionally attached to the top of the shaft. In either case the top of the pinion gear 17*c* is rigidly attached to the bottom-center of the cam plate. The lower section of the cam shaft 17*b* has a set of radially projecting locking splines 17*d* and a tapered end 17*e*. When the cam assembly is in place the pinion gear 17*c* is partially placed within the pinion gear cavity 15*c* in the first glide structure 15 where the teeth of the pinion gear mesh with the teeth on each of the first rack gears 16*b* on the first jaw structure 16*a*. The diameter of the upper cam shaft is sized to fit into the cam shaft bore 15*d* on the first glide structure 15 and the tapered end 17*e* and splines 17*d* are designed to be inserted into the sleeve 13 to hold the cam shaft 17*b* and cam assembly 17 rigidly in place. The cam shaft 17*c* may also be designed so that the upper shaft diameter is sized to fit into the cam shaft bore 15*d* in the first glide structure 15 and the lower shaft diameter sized to fit directly into the first sleeve bore 12*c* and second sleeve bore 12*i* without the use of the sleeve 13.

The fully assembled improved adjustable candleholder 10 is operated by holding the lower section 12*g* of the first base assembly 12. The upper section 12*a* is then rotated in a counter-clockwise direction to cause the three first clamping segments to expand. A candle may then be inserted between the three clamping segments and the upper section is rotated in a clockwise direction to retract the clamping segments and grip the candle.

Figure 9:
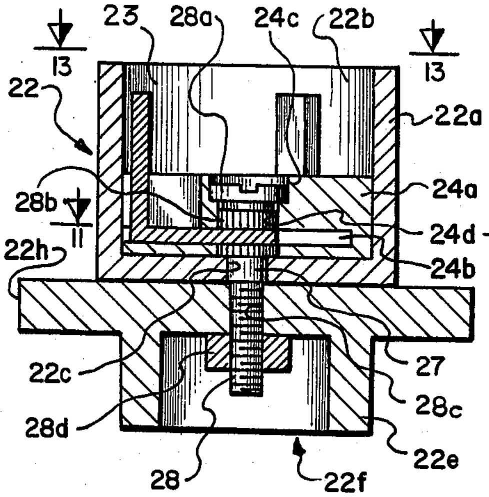
FIG. 9 is a sectional view of the upper and lower sections and the mechanism of the second embodiment.
Figure 10:
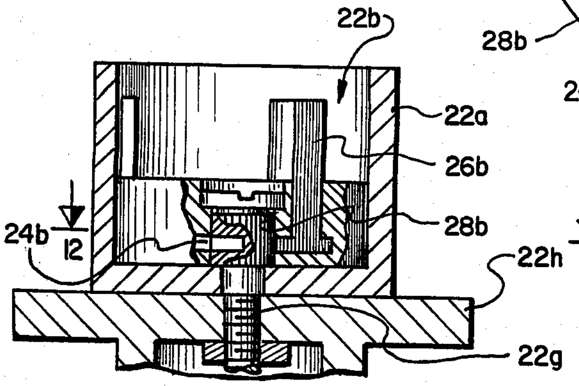
FIG. 10 is a sectional view of the upper and lower sections and another view of the mechanism showing the rack channel.

The second embodiment of the improved adjustable candleholder 10, as shown in FIGS. 9 through 13, is comprised of two major elements: a second base assembly 22 and a second candleholder mechanism 23. The second base assembly 22, as shown in FIGS. 9 and 10, is comprised of an upper section 22*a* and a lower section 22*e*. The upper section 22*a* has a second candle/mechanism cavity 22*b* commencing from its top end that is dimensioned to enclose and retain the second mechanism 23 which, in turn, accepts and secures candles of various sizes and shapes. The bottom of the cavity 22*b* has a centrally located first shaft bore 22*c*. The lower section 22*e* has a second bottom cavity 22*f* extending upwardly from its bottom end. The top of the cavity 22*f* has a second shaft bore 22*g* extending through a flat mounting plate 22*h* and is in alignment with the first shaft bore 22*c* as best shown in FIG. 9. The flat mounting plate 22*h* serves as the base for the upper section 22*a*. The upper section and lower section are rotatably attached by means of the shaft assembly 28.

The second candleholder mechanism 23 which, as in the preferred embodiment is the core of the invention, is inserted into and locked within the second candle/mechanism cavity 22*b*. The mechanism is comprised of a second glide structure 24; a second jaw assembly 25; and a shaft assembly 28. The structure 24, assembly 25 and assembly 28 synergistically operate to allow candles of various diameters and shapes to be centrally located and perpendicularly secured within the cavity 22*b* of the candleholder 10. The jaw assembly 25 is shown in the extended position in FIG. 11 and in the retracted position in FIG. 12.

Figure 13:
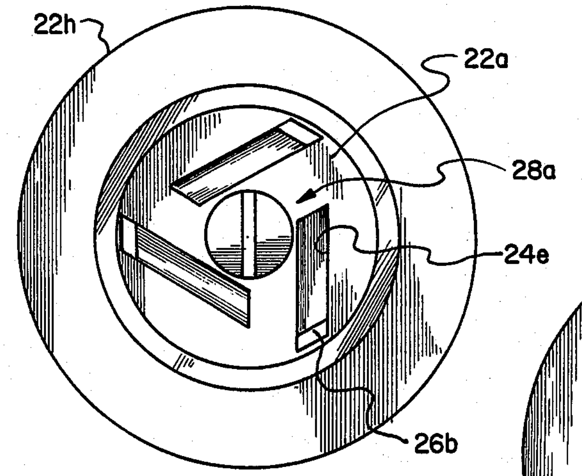
FIG. 13 is a sectional view of the second embodiment taken along lines 13—13 of FIG. 9 showing the configuration of the finger openings.
Figure 12:
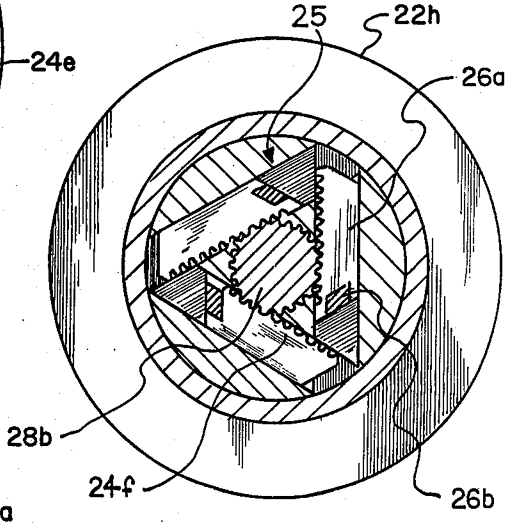
FIG. 12 is a top view of the mechanism taken along lines 12—12 of FIG. 10 showing the rack and pinion in a retracted position.

The second glide structure 24 consists of a second circular disk 24*a* having three vertically stacked second slide channels 24*b*. The three channels, when viewed from the top of the disk 24*a*, form an equilateral triangle. At the centroid of the triangle on the upper surface of the disk is located a fillister head cavity 24*c* where through the center of the cavity is located a pinion gear bore 24*d*. Also located at the top surface of the disk is a finger opening 24*e*, as shown in FIG. 13, that extends upwardly and parallel to each of the channels 24*b*. The disk 24*a* is locked to the inner side walls of the upper section of the second bore assembly by a set of vertically oriented locking splines 24*f* that are evenly distributed around the circumference of the disk.

Figure 11:
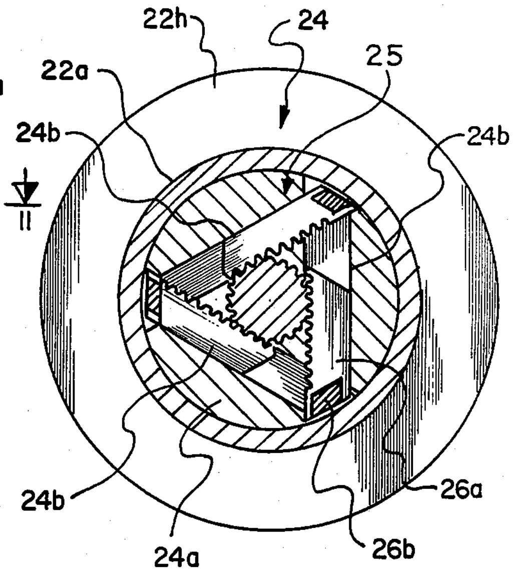
FIG. 11 is a top view of the mechanism taken along lines 11—11 of FIG. 9 showing the rack and pinion in an extended position.

The second jaw assembly 25 is comprised of three identical second jaw structures 26. Each jaw structure 26 is comprised of a second rack gear 26*a* having its set of gear teeth extending inwardly towards the center of the second circular disk 24*a*. The rack gears are dimensioned to slideably traverse their corresponding second slide channel 24*b* on the second circular disk 24*a*. Extending upwardly and normal to the side of the rack gear 26*a* is a second finger segment 26*b*. The finger is positioned at an obtuse angle with respect to the longitudinal bottom of the rack gear as best shown in FIG. 11.

When all three second jaw structures 26 are positioned in their corresponding second slide channels 24*b* the finger segments form a segmented triangular pattern.

The shaft assembly 27 is comprised of a threaded shaft 28 having a fillister type head 28*a* on its upper end, a second pinion gear 28*b* having a central pinion gear bore 28*c* and a shaft nut 28*d*. The bore 28*c* is of a diameter that allows the gear 28*b* to be press fitted against the bottom end of the fillister type head 28*a*. The shaft 28 and the gear 28*b* may also be designed with key slots that allow a key to be inserted to prevent the gear from rotating. After the second pinion gear 28*b* is in place the assembled shaft 28 is inserted into the fillister head cavity 24*c* where the outer bottom end of the head rests on top of the fillister head cavity 24*c* and the gear is rigidly held within the pinion gear bore 24*d* on the second glide structure 24. The remainder of the threaded shaft 28 is inserted through the first shaft bore 22*c* and the second shaft bore 22*g* located on the upper section and lower section respectively of the second base assembly 22. The shaft nut 28*d* is used to tighten the shaft 28 against the bottom of the flat mounting plate 22*h* of the lower section. The nut is tightened sufficiently to allow the upper section to rotate with friction about the lower section.

Figure 14:
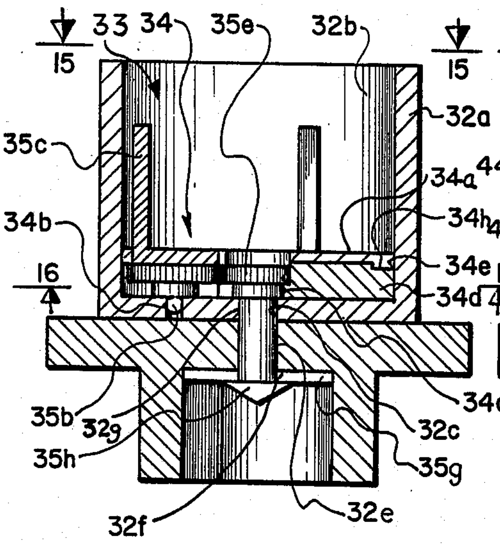
FIG. 14 is a sectional view of the upper and lower sections and the mechanism of the third embodiment.
Figure 15:
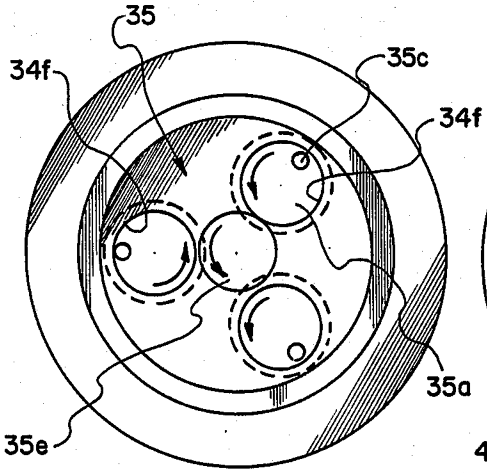
FIG. 15 is a top view of the mechanism taken along lines 15—15 of FIG. 14 showing the configuration of the sun gear and three planetary gears.
Figure 16:
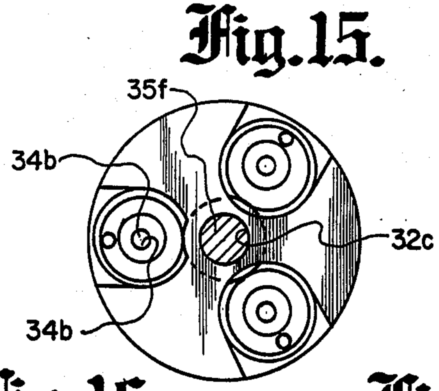
FIG. 16 is a bottom view of the mechanism taken along lines 16—16 of FIG. 14 also showing the configuration of the sun gear and three planetary gears.

The third embodiment of the improved adjustable candleholder 10, as shown in FIGS. 14, 15 and 16, is comprised of two major elements: a third base assembly 32 and a third candleholder mechanism 33.

The third base assembly 32, as shown in FIG. 14, is comprised of an upper section 32*a* and a lower section 32*e*. The upper section 32*a* has a third candle/mechanism cavity 32*b* commencing from its top end that is dimensioned to enclose and retain the third mechanism 33 which, in turn, accepts and secures candles of various sizes and shapes. The bottom of the cavity 32*b* has a centrally located first sun gear shaft bore 32*c*. The lower section 32*e* has a third bottom cavity 32*f* extending upwardly from its bottom end. The top of the cavity 32*f* has a second sun gear shaft bore 32*g* extending through a flat mounting plate 32*h* and in alignment with the first sun gear shaft bore 32*c* as shown in FIG. 14. The flat mounting plate 32*h* serves as a base for the upper section 32*a*. The upper section and lower section are rotatably attached by means of the sun gear shaft 35*f*.

The third candleholder mechanism 33 is dimensioned to be inserted into and locked within the third candle mechanism cavity 32*b*. The mechanism is comprised of two major elements: a third circular disk 34 and an epicyclic gear train 35.

The third circular disk 34, as shown in FIGS. 15 and 16, is locked to the inner side walls of the upper section of the third base assembly by a set of vertically oriented locking splines 34*d* that are evenly distributed around the circumference of the lower section of the disk. The disk 34 is comprised of a lower section 34*a* and an upper section 34*e*. The lower section has three planetary gear shaft bores 34*b* where the center of each bore is located at the apex of an equilateral triangle. At the centroid of the equilateral triangle is located a third sun gear shaft bore 34*c*. The upper section 34*e* is shaped like an inverted cap having an outside diameter equal to that of the lower section 34*a*. The upper section has three finger bores 34*f* where the center of each bore is located at the apex of an equilateral triangle which is congruent to the triangle of the bores 34*b*. Thus, the bores 34*b* and 34*f* are in alignment. The diameter of the finger bores is less than the diameter of the gear shaft bores 34*b* by an amount that allows the gear teeth of the planetary gears 35*a* to be hidden when the upper section is viewed from the top. The upper section 34*e* is rigidly attached to the lower section 34*a* by gluing it to the top of the lower section after the epicyclic gear train 35 is installed.

The epicyclic gear train assembly 35 as best shown in FIG. 15, is comprised of three planetary gears 35*a* and a sun gear 35*e*. The center of each planetary gear is located at the apex of the equilateral triangle and the center of the sun gear is located at the centroid of the equilateral triangle. When the gear train is in place the gear teeth of the sun gear mesh with the teeth of the planetary gears. At the bottom of each planetary gear 35*a* is a downwardly extending, rigidly attached planetary gear shaft 35*b* having a diameter that allows the shaft to rotate around its corresponding planetary gear shaft bore 34*b* on the lower section of the third circular disk 34. On the upper side of the planetary gear is a finger 35*c* extending upwardly near the edge of the gear such that when the three gears rotate by the action of the rotating upper section of the third base assembly the fingers expand and retract in a segmented triangular pattern.

The sun gear 35*e* as shown in FIG. 14 has on its bottom side a downwardly extending sun gear shaft 35*f* having a diameter that allows the shaft to be sequentially inserted through the third sun gear shaft bore 34*c* on the lower section of the third circular disk 34, the first sun gear shaft bore 32*c* in the upper section 32*a* of the third base assembly 32 and through the second sun gear shaft bore 32*g* on the lower section 32*e* of the third base assembly 32. The sun gear shaft 35*f* is fastened to the inside of the lower section 32*e* by means of a spring washer 35*g* and a one-way spring fastener. The rigidly fastened sun gear shaft 35*f* prevents rotation of the sun gear 35*e* and allows the upper section 32*a* and lower section 32*e* of the third base assembly 32 to be rotatably attached.

The three embodiments of the improved adjustable candleholder 10 can also be manufactured with the circular disk, gear and shaft molded as a part of the upper section of the base assembly. For example, in the third embodiment the upper section 32*a* can be made of a one-piece molded structure consisting of the circular disk 34, the sun gear 35*e* and a centrally located shaft 32*c*. The entire structure is inserted into the second sun gear shaft bore 32*g* and secured by the spring washer 35*g* and spring fastener 35*h*.

Figure 17:
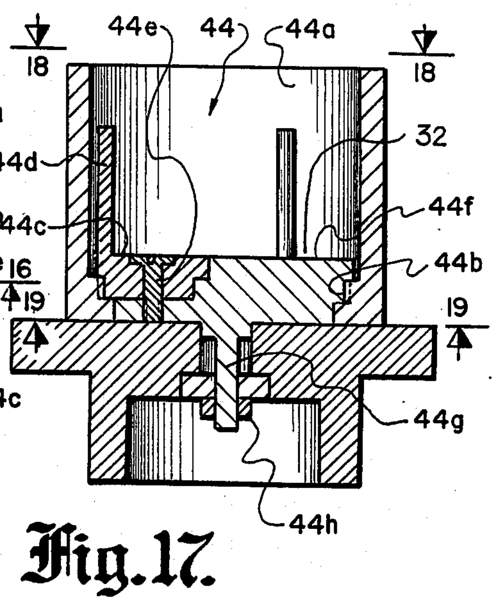
FIG. 17 is a sectional view of the upper and lower sections and the mechanism of the fourth embodiment.
Figure 18:
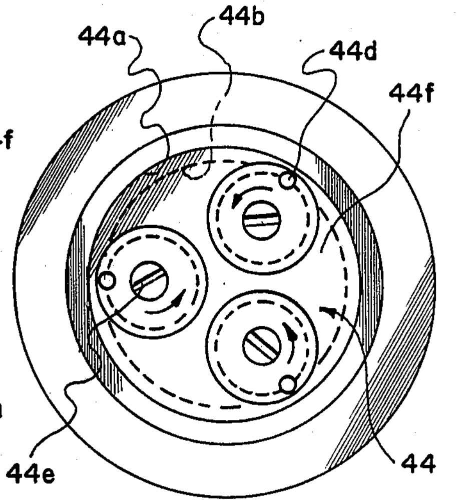
FIG. 18 is a top view of the mechanism taken along lines 18—18 of FIG. 17 showing the configuration of the three planetary gears in contact with the innerwall circumference gear.
Figure 19:
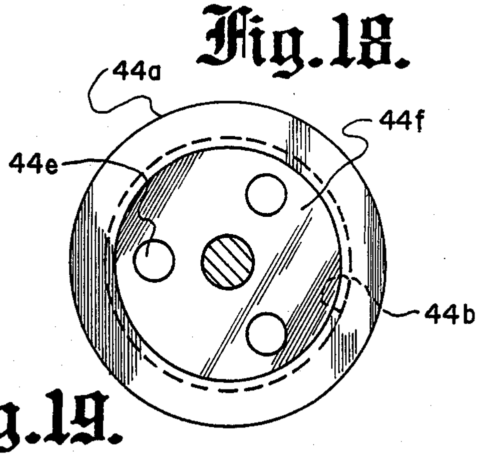
FIG. 19 is a bottom view of the mechanism taken along lines 19—19 of FIG. 17 showing the triangular hole pattern of the three planetary gears.

The fourth candleholder 10 mechanism, as shown in FIGS. 17, 18 and 19, is dimensioned to be inserted into the fourth candle/mechanism cavity 44. The mechanism is comprised of three major elements: an upper section 44*a* incorporating an inner wall circumference gear 44*b*, a set of three planetary gears 44*c*, and a fourth circular disk 44*f*.

The circular disk 44*f* has three threaded disk bores placed in an equilateral triangular pattern and a center threaded shaft 44*g* extending downwardly. The circular disk is locked within the cavity 44 by inserting the threaded shaft 44*g* through a corresponding bore in a lower section and tightening the shaft with a nut 44*h* as shown in FIG. 17. When the planetary gears 44*c* are rotatably attached to the top of the disk 44*f*, by means of a threaded screw 44*e* inserted through a center bore in the gear and into the threaded disk bores, the gear teeth on the planetary gears mesh with the gear 44*b* on the upper section. Thus, when the upper section 44*a* is rotated the three planetary gears rotate, as shown in FIGS. 18 and 19, to allow the gear fingers 44*d*, which extend upwardly and are located near the top edge of the gears, to retract and expand in accordance with the size of the candle to be secured.

Figure 20:
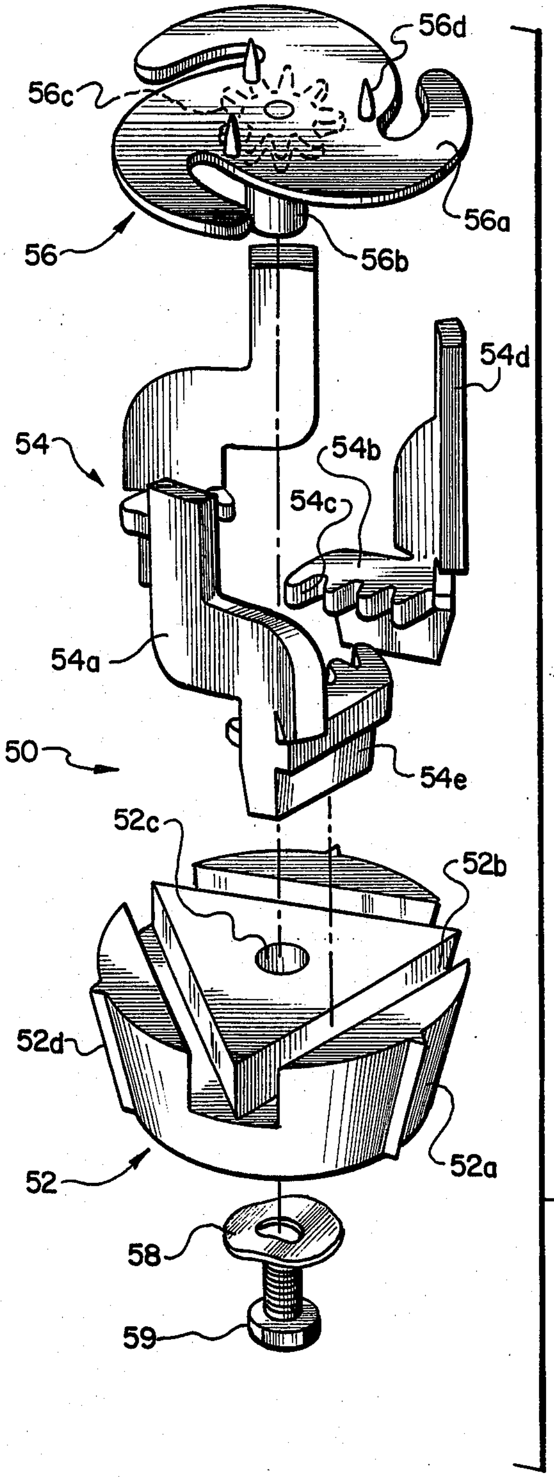
FIG. 20 is an exploded view of the adjustable candleholder mechanism insert.
Figure 21:
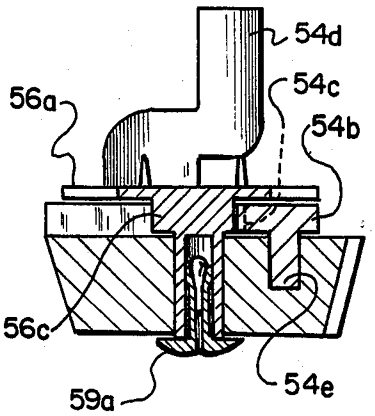
FIG. 21 is a sectional view of the assembled adjustable candleholder mechanism insert.

The fifth embodiment, as shown in FIGS. 20 and 21, consists of an adjustable candleholder mechanism insert 50 that is designed to be inserted into the cavity of a conventional one-piece candleholder. The mechanism is designed to operate independently from the candleholder base by allowing the mechanism jaws to close and open by rotating the candle inserted into the mechanism. The mechanism 50, which is similar to the mechanism of the first embodiment, is comprised of three major elements: a third glide structure 52, a third jaw assembly 54 and a second cam assembly 56. All three elements are designed to synergistically operate to allow candles of various diameters to be centrally located and perpendicularly secured within the mechanism.

The third glide structure 52, as shown in FIG. 20, is comprised of a fifth circular disk 52*a* that has on its top surface three fifth glide channels 52*b* that form an equilateral triangle. On the upper surface of the disk 52*a* and at the centroid of the triangle there is a cam shaft bore 52*c* extending therethrough. The disk 52*a* has a set of vertically oriented locking splines 52*d* that are evenly distributed around the side circumference of the disk 52*a*. When the disk is pressed into the opening of the candleholder the splines are embedded into the inner side walls of the candleholder. Thus, holding the disk firmly in place.

The third jaw assembly 54, as also shown in FIG. 20, comprises three identical third jaw structures 54*a.* Each structure is comprised of a third rack gear 54*b,* a third clamping segment 54*d,* and a third slide 54*e.* The third rack gear 54*b* has a plurality of gear teeth 54*c* that extend inwardly towards the center of the fifth circular disk 52*a.* On the outward upper side surface of the rack gear there is located a third clamping segment 54*d.* The segment is curved inwardly and extends upwardly and normal to the side of the third rack gear. On the longitudinal bottom side of the third rack gear 54*b* there is a contiguous third slide 54*e* extending in a downwardly direction. The slide is dimensioned to slideable traverse the corresponding fifth slide channel 52*b* on the fifth glide structure 52. When all three of the jaw structures 54*a* are positioned in their corresponding fifth slide channels 52*b* the clamping segments form a segmented circular pattern that can securely grip a candle.

The clamping segments which expand and retract are guided in their travel by the second cam assembly 56. The cam assembly is comprised of an elliptical cam plate 56*a,* a cam shaft 56*b,* a pinion gear 56*c* and a set of candleholding prongs 56*d* that are rigidly and vertically attached to the top center of the cam plate 56*a.* The cam plate, as shown in FIG. 20, has three evenly spaced curved openings where each opening is shaped to conform to the inward curve of the third clamping segment 54*d.* In the preferred embodiment the cam shaft 56*b* and pinion gear 56*c* are constructed as a single contiguous structure. However, as in the first embodiment the pinion gear may be a separate entity and conventionally attached to the top of the shaft. In either case the top of the pinion gear 56*c* is rigidly attached to the bottom-center of the cam plate. When the cam assembly is in place, as shown in FIG. 21, the cam shaft 56*b* is inserted through the cam shaft bore 52*c* and the bottom of the pinion gear 56*c* rotatably rests on the top surface of the third glide structure 52 with the gear teeth 54*c* of the pinion gear meshing with the teeth 54*c* on each of the third rack gears 54*b* located on the third jaw structure 54*a.* The cam shaft 56*b* is rotatably held in place by first inserting a wave washer 58 into the cam shaft protruding through the bottom of the cam shaft bore and then riviting the end of the shaft with a pop rivit 59*a.* As an alternate fastening means the inside diameter of the bottom of the cam shaft can be threaded into which is then threaded a bolt 59.

To operate the adjustable candleholder mechanism insert 50 a candle is approximately centered and impaled upon the candle holding prongs 56*d.* Once the candle is firmly attached, it is rotated in a counterclockwise direction to cause the third clamping segments 54*d* to close and grip the candle.

Although the mechanisms has been described in terms of its usage on a candleholder it should not be limited to such use. The mechanism can also be used in any application where a rod must be centrally secured within an enclosure or in a situation in which a rod circular or not must be temporarily centered. Therefore, while the invention has been described in complete detail and pictorially shown in the accompanying drawings, it is not to be limited to such details, since many changes and modifications may be made to the Improved Adjustable Candleholder without departing from the spirit and scope thereof. Hence, it is described to cover any and all modifications and forms which may come within the language and scope of the claims.

I claim:

1. An improved adjustable candleholder comprising:

(a) a first base assembly comprising an upper section and a lower section with the upper section having a first candle/mechanism cavity in its top end and having a centrally located first sleeve bore in its bottom end, with the lower section having a first bottom cavity extending upwardly from its bottom end and with the top end of the cavity having a second sleeve bore extending therethrough and in alignment with the first sleeve bore, (b) a sleeve inserted and positioned between the first and second sleeve bores where said sleeve serves as an attachment and rotation shaft that allows the upper section and lower sections to be rotatably attached, (c) means for holding said sleeve in place in the lower section, by filling the first bottom cavity housing and the exposed sleeve with a potting compound and, (d) a first candleholder mechanism inserted into said first candle/mechanism cavity where said mechanism is comprised of a first glide structure, said first glide structure comprises a first circular disk having on its top surface three first slide channels where the three channels form an equilateral triangle, and also having a pinion gear cavity located on the upper surface of the disk at the centroid of the equilateral triangle with the bottom-center of the pinion gear cavity having a cam shaft bore extending therethrough, a set of vertically oriented locking splines, evenly distributed around the circumference of first circular disk, that lock the disk to the inner side walls of the upper section of said first base assembly, a first jaw assembly, said first jaw assembly is comprised of three identical jaw structures where each of the jaw structures comprises the following contiguous elements:

a first rack gear having a plurality of gear teeth extending inwardly towards the center of said first glide structure, a first clamping segment located on the outward upper side of the first rack gear where the segment is curved inwardly and extends upwardly and normal to the side of the first rack gear, and a slide extending in a downwardly direction along the longitudinal bottom side of the first rack gear where slide is dimensioned to slideably traverse the corresponding first slide channels on said first glide structure and where when all three of the jaw structures are positioned in there corresponding first slide channels the clamping segments form a segmented circular pattern and a cam assembly said cam assembly comprises:

an elliptical cam plate having three evenly spaced curved openings where openings are shaped to conform to the inward curve of the first clamping segment, a pinion gear centrally and rigidly attached to the bottom-center of the cam plate with the pinion gear partially placed within the pinion gear cavity in said glide structure and where teeth of the pinion gear mesh with the teeth of the rack gear on the first jaw structure, and a cam shaft having an upper section and a contiguous lower section where the upper section is rigidly attached to the bottom of the pinion gear and where diameter of upper cam shaft is sized to fit into the cam shaft bore on said first glide structure and where lower section has a set of radially projecting locking splines and a tapered end where lower section and splines are designed to be inserted into said sleeve to hold the cam shaft rigidly in place, where said cam shaft is further comprised on a one-piece structure incorporating on its upper end a pinion gear that is rigidly attached to the cam plate and having a two-diameter shaft extending downwardly from the pinion gear where upper shaft diameter is sized to fit into the cam shaft bore on said first glide structure and where lower shaft diameter is sized to fit into the first sleeve bore and second sleeve bore and where the shaft allows the upper section and lower section of said first base assembly to be rotatably attached, where said first glide structure, first jaw assembly and cam assembly function in combination to allow candles of various diameters and shapes to be centrally located and secured perpendicularly within the candleholder, and the first glide structure and the upper section of said first base assembly are molded as a single element.

2. An adjustable candleholder mechanism insert comprising:

(a) a candleholder having a cavity on its upper side, (b) a third glide structure comprising:

(1) a fifth circular disk having on its top surface three fifth glide channels that form an equilateral triangle, and also having a cam shaft bore extending therethrough located at the centroid of the equilateral triangle, (2) means for radially locking said disk to the inner wall of said cavity on said candleholder by having a set of vertically oriented locking splines evenly distributed around the side circumference of said fifth circular disk, (c) a third jaw assembly comprising three identical third jaw structures where each of the third jaw structures comprise the following contiguous elements:

(1) a third rack gear having a plurality of gear teeth extending inwardly towards the center of the fifth circular disk, (2) a third clamping segment located partially on the outward side of the third rack gear where the segment extends upwardly and normal to the side of the third rack gear, (3) a third slide extending in a downwardly direction along the longitudinal bottom side of the third rack gear where slide is dimensioned to slideably traverse its corresponding fifth glide channel on said third glide structure and where when all three of the jaw structures are positioned in their corresponding fifth glide channels the clamping segments form a segmented circular pattern.

(d) a second cam assembly comprising:

(1) an elliptical cam plate having three evenly spaced curved openings where openings are shaped to conform to the shape of the third clamping segment of said jaw structure, (2) a means for rigidly holding a candle against the top-center of the cam plate by impaling the bottom of the candle into a set of candleholding prongs rigidly and vertically attached to the top-center of the cam plate, (3) a pinion gear centrally and rigidly attached to the bottom-center of the cam plate, (4) a cam shaft extending in a downwardly direction from the bottom-center of the pinion gear where the cam shaft is inserted through the cam shaft bore allowing the bottom of the pinion gear to rotatably rest on the top surface of the third glide structure with the gear teeth of the pinion gear meshing with the teeth on each of the third rack gear on said third jaw structure and where the cam shaft is held in place at the bottom side of the third glide structure by riveting the bottom end of the cam shaft.

* * * * *